United States Patent [19]
Fang

[11] Patent Number: 5,547,323
[45] Date of Patent: Aug. 20, 1996

[54] THREADED BUSH

[76] Inventor: Steven Fang, 288-5, Sec. 4, Tien Chin Rd., Taichung, Taiwan

[21] Appl. No.: 251,292

[22] Filed: May 31, 1994

[51] Int. Cl.$^6$ ............................ F16B 35/04; F16B 37/12
[52] U.S. Cl. ........................... 411/178; 411/386; 411/418
[58] Field of Search ..................... 411/178, 386, 411/418, 419, 420

[56] References Cited

U.S. PATENT DOCUMENTS

| | | | |
|---|---|---|---|
| 2,823,574 | 2/1958 | Rosan | 411/418 X |
| 3,451,080 | 6/1969 | McIntyre et al. | 411/418 |
| 3,866,509 | 2/1975 | Kraus et al. | 411/386 X |
| 3,866,510 | 2/1975 | Eibes | 411/418 |
| 4,223,585 | 9/1980 | Barth et al. | 411/386 X |
| 4,449,874 | 5/1984 | McKinney | 411/418 |
| 4,730,968 | 3/1988 | Diperstein et al. | 411/178 |

FOREIGN PATENT DOCUMENTS 2514086  4/1983  France ................................. 411/178

Primary Examiner—Neill R. Wilson

[57] ABSTRACT

A threaded bush having a cylindrical body provided with a female thread in an inner surface, a male thread in an outer surface, a plurality of triangular recessed stop grooves spaced equally in a lower sloping-down portion, each stop recessed groove formed with a vertical side wall and a curved side wall defining a small angle, the curved side wills guiding and cutting in a wall of a hole which this bush is to be screwed in, the vertical side wall cutting positively the wall of the hole, the triangular recessed stop grooves engaging uncut wall material of the hole to prevent this bush from loosening out of the hole.

1 Claim, 3 Drawing Sheets

THREADED BUSH

BACKGROUND OF THE INVENTION

Common widely used threaded bushes are shown in FIGS. 1 and 2, having some round holes in a lower end or some vertical V-shaped grooves b spaced apart equally in an outer surface. The conventional threaded bush shown in FIG. 1 has almost the same diameter in both ends, so it does not tightly engage a hole wherein this bush is positioned after it is screwed therein. The second conventional threaded bush shown in FIG. 2, is shaped as a cone with an upper and a lower flat end, comparatively easy to move into a hole of a component, but it may loosen out because of the V-shaped grooves after a long period of use.

SUMMARY OF THE INVENTION

This invention has been devised to offer a kind of threaded bush provided with function to screw into a hole with readiness and to stay therein without possibility of loosening out of the hole.

A main feature of this invention is provision of a lower cone-shaped portion in the body of a threaded bush and a plurality of triangular recessed stop grooves spaced equi-distanced in the lower cone-shaped portion, and each triangular recessed stop groove is defined by a vertical side wall and a curved side wall, engaging uncut wall material of a hole into which the threaded bush is to be screwed.

DETAILED DESCRIPTION OF THE INVENTION

Figure 1:
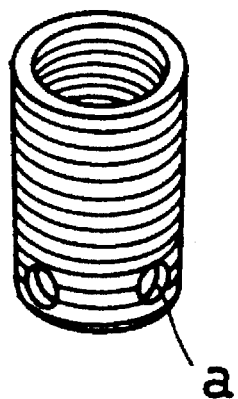
FIG. 1 is a perspective view of a conventional threaded bush.
Figure 2:
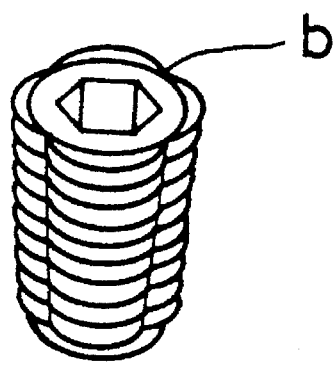
FIG. 2 is a perspective views of another conventional threaded bush.
Figure 3:
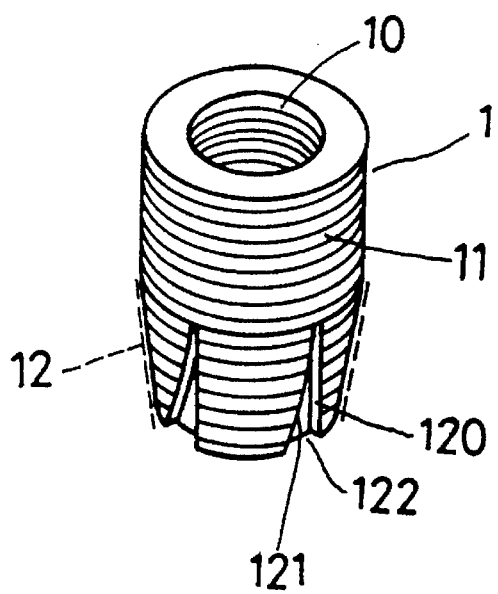
FIG. 3 is a perspective view of a threaded bush in the present invention.
Figure 4:
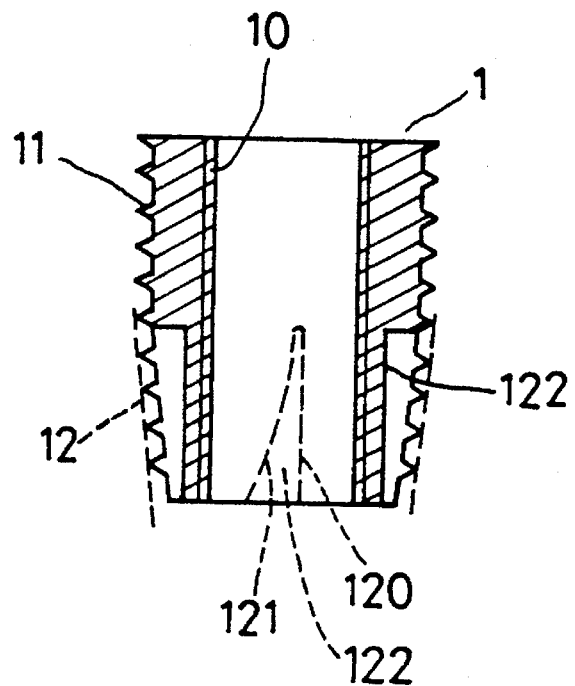
FIG. 4 is a cross-sectional view of the threaded bush in the present invention.

A threaded bush in the present invention, as shown in FIGS. 3 and 4, comprises a cylindrical body 1 provided with a female thread 10 in an inner surface, a male thread 11 on an outer surface, a lower sloping-down portion 12, and a plurality of triangular recessed stop grooves 122 formed in the lower sloping-down portion 12 spaced in an equal distance. Each triangular recessed groove 12 has a vertical wall 120 and a curved wall 121 forming an angle with the vertical wall 120.

Figure 5:
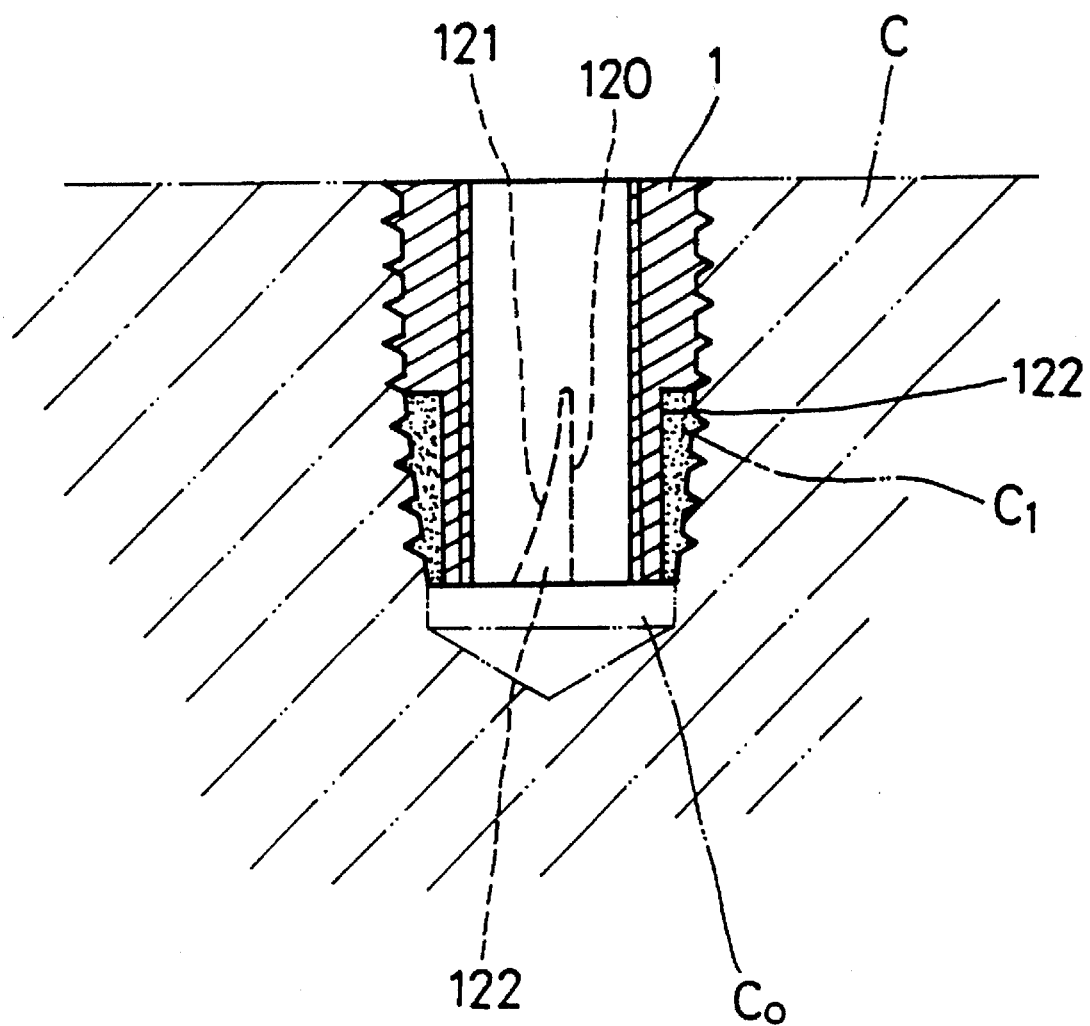
FIG. 5 is a cross-sectional view of the threaded bush in the present invention, showing a practical condition wherein it is used.

In using this threaded bush, as shown in FIG. 5, the body 1 of the threaded bush is first placed in a pre-bored round hole C0 in a component C, and screwed, with the four curved side walls 121 guiding by cutting in the wall of the round hole C0 of the component C and with the vertical side walls 120 cutting the wall of the round hole C0. Thus this threaded bush can quickly screw in the round hole C0, forcing uncut wall material C1 remain in the recessed groove 122 defined by the vertical wall 120 and the curved wall, and then preventing this threaded bush from falling off the round hole C0 even after a long period of use.

As can be understood from the above description, this embodiment of a threaded bush has following advantages.

1. This threaded bush can be screwed with easiness into a round hole of a component, by means of the curved side walls 121 as guidance and the vertical wall 120 as a cutting tool to cut the wall of the round hole.

2. The triangular recessed stop grooves 122 can engage wall material of the round hole this threaded bush is screwed in, holding the bush tightly, not letting the bush easily loosen out.

3. This threaded bush does not produce any small bits of waste or scrap.

What is claimed is:

1. A threaded bush comprising a hollow cylindrical body provided with a female thread on an inner surface, a male thread on an outer surface, a lower sloping down portion, and a plurality of generally triangular recessed stop grooves spaced equi-distantly in said lower sloping-down portion, each recessed stop groove formed by a vertical side wall and a curved side wall with an angle defined by both said side walls, said recessed stop grooves engaging uncut wall material of a hole said bush is screwed in, preventing said bush from loosening out.

* * * * *